United States Patent [19]
Lenhardt et al.

[11] Patent Number: 5,453,785
[45] Date of Patent: Sep. 26, 1995

[54] MEASUREMENT CAMERA WITH FIXED GEOMETRY AND RIGID LENGTH SUPPORT

[75] Inventors: Karl Lenhardt; Heinz Körpert; Otto Thomas, all of Bad Kreuznach, Germany

[73] Assignee: Jos. Schneider Optische Werke Kreuznach GmbH & Co. KG, Bad Kreuznach, Germany

[21] Appl. No.: 98,480

[22] Filed: Jul. 28, 1993

[51] Int. Cl.⁶ ................................................ H04N 5/232
[52] U.S. Cl. ........................................ 348/357; 348/374
[58] Field of Search ................................ 348/345, 335, 348/373, 374, 375, 376, 135, 142; H04N 5/232

[56] References Cited

U.S. PATENT DOCUMENTS

| | | | |
|---|---|---|---|
| 4,570,185 | 2/1986 | Arai et al. | 348/345 |
| 5,032,919 | 7/1991 | Randmae | 348/374 |
| 5,221,964 | 6/1993 | Chamberlain et al. | 348/335 X |

Primary Examiner—Wendy R. Greening
Attorney, Agent, or Firm—Herbert Dubno

[57] ABSTRACT

A measuring camera has a camera housing fixed to a rigid frame providing a reference surface against which an objective lens unit is held so that for a plurality of such units, all can have their respective projection centrums located at a fixed position within the housing. The frame has guides on which a sensor, e.g. of the CCD type, is mounted for movement parallel to the optical axis without play.

15 Claims, 5 Drawing Sheets

MEASUREMENT CAMERA WITH FIXED GEOMETRY AND RIGID LENGTH SUPPORT

SPECIFICATION

1. Field of the Invention

The invention relates to a measurement camera comprising an objective, a camera body, a semiconductive image converter with camera electronics and means for focussing.

2. Background of the Invention

For the contactless measurement of length in two-dimensional and three-dimensional space, video cameras have increasingly been incorporated in measuring systems and measured-value pickups. In such cases the measuring principle uses the central projection of the object points in an image plane. The image, after digitalization, is interpreted in an image processing computer, and stretches between contour features in the image are measured. Known preconditions for this are a sufficiently precisely defined camera constant and position of the photogrammetric principal point. These parameters define the so-called internal orientation of the measurement camera. In the range of digital near-region or close-range photogrammetry, an image-associated converging pickup is impossible with the spatial arrangement of the object points.

The measurement precision of the video-measurement technique is directly dependent upon the precision and stability of the parameters of the internal orientation. By calibration, these parameters can be determined. Many times standard video cameras, preferably with solid-body-surface sensors or line sensors, are used for the measurement technique without sufficient consideration, however, of the stability of the internal orientation. The following factors especially serve to reduce the precision of these measuring units:

- The objective is connected by a threaded C-mount attachment
- The objective is connected by a C-mount attachment (threaded) with the camera, thereby preventing a reproducible locating of the projection center from being ensured.
- The focussing is effected by means of a worm drive on the objective tube. The worm wheel is associated with play with the consequence that the projection center cannot be accurately positioned.
- The image converter is imprecisely oriented with reference to the optical axis.
- Upon setting of the image distance for focussing, the actual camera constants are not known so that a new calibration may have to be undertaken.
- Temporal fluctuations in environmental factors (temperature, humidity, vibration) can change the position of the projection center.
- The residual errors as, for example, the distortion of the objective, are not known or are not taken into consideration.

While in the framework of digital image processing, it is customary to operate with subpixel algorithms and purely numerically high precisions can be postulated, because of the above-mentioned influencing factors the provable precisions deviate therefrom by orders of magnitude.

OBJECT OF THE INVENTION

The object of the invention is to provide an improved measurement camera which can avoid the precision limiting influences which have affected prior measuring cameras heretofore so that the measuring precision can be significantly increased.

This object is attained, in accordance with the invention, in a measurement camera which comprises an objective, a camera body, a semiconductive image converter with its camera electronics and means for focussing. According to the invention the camera body comprises a camera housing and a measuring head. For focussing, a semiconductive image converter (semiconductive image sensor) is axially shiftable within the camera body along the optical axis. Also in this focussing the position of the projection centrum of the objective relative to the coordinate system, which is fixed with respect to the housing, is held constant.

The increase in the measuring precision of the measuring camera is thus a result of the shifting of the focussing means to and its integration in the interior of the camera body and, indeed, through the shiftable arrangement there of the semiconductive converter along the optical axis of the measuring camera, whereby the shifting is effected by means of high-precision guidance. The optically effective groups of the objective thus experience, with respect to their lateral as well as axial positions, with reference to the objective-camera interface, significantly more precise values than with conventional measuring cameras, in which the means for axial shifting acts upon individual optically effective groups or the total optical system at the objective side. Since the guide track of the semiconductive converter is oriented with the narrowest parallelity tolerances to the reference axis of the measuring head and the objective-camera interface, during the focussing displacement the image meandering out of range is correspondingly small and is, to a high degree, reproducible by the selection of the guide means, i.e. is measurable and correctable. The high stiffness of the guide construction also guarantees the constancy with time of the geometrical factors. Since, according to the invention, the objective-camera interface has been newly defined from the point of view of the use, the reproducibility precision especially is substantially increased by comparison with earlier interfaces. By the design of the objective-camera interface, narrow tolerances apply with respect to the lateral, axial and azimuthal orientations of the objective to the camera body. Even with focussing, the stable positions of the projection centrum with reference to the housing-fixed coordinate system of the camera is maintained. Residual errors which remain, e.g. the distortion of the objective, can be corrected by a computer given the construction of the measuring camera of the invention. The high measuring precision of the measuring camera can be supported by and augmented by the use of precision measurement objectives.

From the integration of the semiconductive converter, guide, drive and actual-value generator components for contactless measurement technology, there results a high degree of reproducibility of precision, a reduced calibration cost and an automatable focussing possibility, while simultaneously preserving the high measurement precision. Also, various autofocussing processes can be integrated in the system. Thus the invention also has plain and simple significance for the camera construction and the objective construction.

BRIEF DESCRIPTION OF THE DRAWING

Further features, details and advantages of the invention will appear from the following description of an embodiment, with reference to the appended drawings. In the drawing.

SPECIFIC DESCRIPTION

Figure 1:
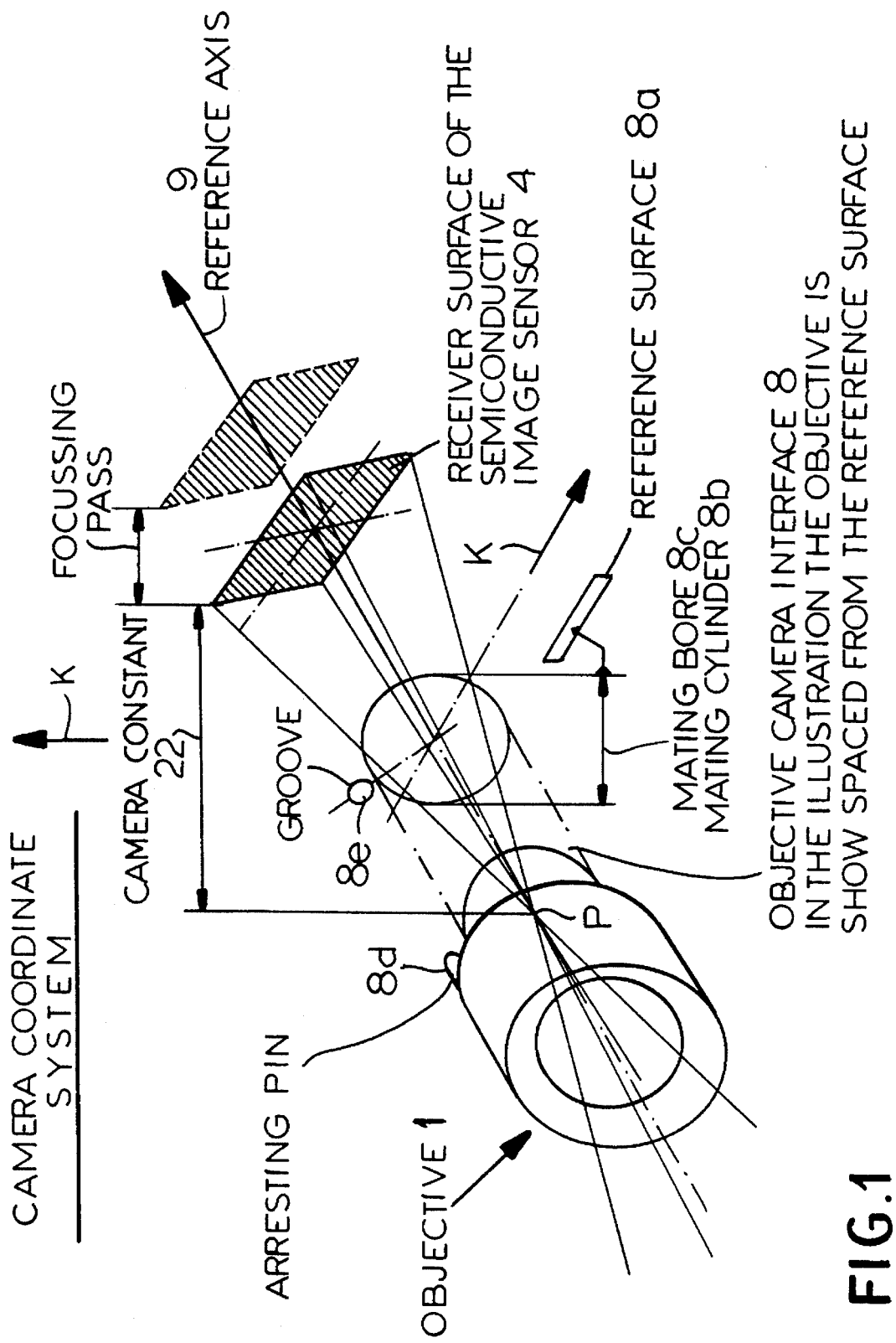
FIG. 1 is a schematic three-dimensional illustration, of the measuring system of a measuring camera according to the invention.

FIGS. 1, 2, 3 and 4 show the measuring system of a measuring camera according to the invention. In the schematic illustration of FIG. 1, the measuring objective 1 has is shown removed from the reference surface 8a of the measuring head 3 of the camera housing 2 (see also FIG. 2). Within the camera housing 2, the semiconductive image sensor or converter, is carried by a sensor carrier 5 and is fixed upon it. The sensor carrier 5 is guided on a roller path constituted by guide columns 6a, guide sleeves 6b, ball cages 6c and guide balls 6d which, in turn, is mounted on a support 7 extending in the interior of the camera housing 2. By means of this guide, the sensor carrier 5, with the semiconductive image sensor 4, is axially shiftable or adjustable in the measuring head 3 in the direction toward the objective 1 and from the objective 1 back (according to the drawing FIG. 2, from right to left and again to the right). In this manner the semiconductive image sensor 4 performs in the measuring head 3 an axial focussing movement along the reference axis 9 of the measuring head. That contrasts with hitherto provided measuring cameras of the state of the art in which the means for focussing the measuring camera for different object distances from the objective in the measuring head is formed by the measuring head and the camera body formed by the camera housing.

In the showing of FIG. 1, the projection centrum of the objective 1 has been indicated at P and 9 represents the reference axis of the measuring head 3. The two diagonally hatched fields represent the receiving surfaces of the semiconductive image sensor 4, in one case in its extreme forward position and in the other case in its extreme rearward position, whereby the distance between these positions forms the focussing range of the semiconductive image sensor 4. The positions of the semiconductive image sensor 4 for the focussing range are to be determined in dependence upon the focal length of the objective 1 and the desired imaging scale magnification or reduction $\bar{A}$ ($\bar{A}$=0.025 to 0.1) selected. The arrow 22 represents the camera constant and the arrow K the (housing-fixed) coordinate system of the measuring camera (FIG. 1). The interface 8 between the objective 1 and the camera body 3,2 is newly defined and is fixed by elements capable of exact axial fixation, namely the reference surfaces 8a on measuring head 3 (FIGS. 1, 2, 3), by elements capable of lateral fixation, namely, the close-fitting cylinder 8b on objective 1 (FIGS. 1, 4) and juxtaposed close-fitting bore 8c in measuring head 3 (FIGS. 1, 2), and, for azimuthal orientation, namely, the arresting pin 8d on the objective 1 (FIG. 1) which engages in a groove 8e on the measuring head 3 (FIGS. 1, 3).

From the measuring head 3, there extends at its lower portion (according to the illustration of FIG. 2) from its rearwardly turned surface and formed in one piece therewith, a cast part extending at a right angle and forming the support 7 for roller guidance within the interior of the camera housing 2. The support 7 extends sufficiently to enable the roller guidance of the sensor carrier 5 of the semiconductive image sensor 4 in its travel even into its extreme rearmost position along its focussing path. From there, the support projects to a certain degree, approximately up to the upper boundary of the roller guide of the sensor carrier 5, with a right angle upwardly (see the illustration of FIG. 2), and forms preferably in longitudinal and transverse sections of the camera body 3,2 a tray or box in this lower region.

The support 7 is preferably formed as a closed frame construction with a limited right-angled projection 7a in the interior of the camera housing 2 in the upper region of the measuring head 3 (according to drawing FIG. 2) with the projection 7a in the upper region and the projection 7 in the lower region connecting by outer side walls 7b at both sides and whose rearward edges are inclined downwardly from the upper projection 7a in the direction of the upwardly angled endpiece of the support 7 in the lower region. This frame construction, the measuring head 3 and the support 7 with the upper projection 7a and the sidewalls 7b preferably are made in one piece as a cast part.

Figure 2:
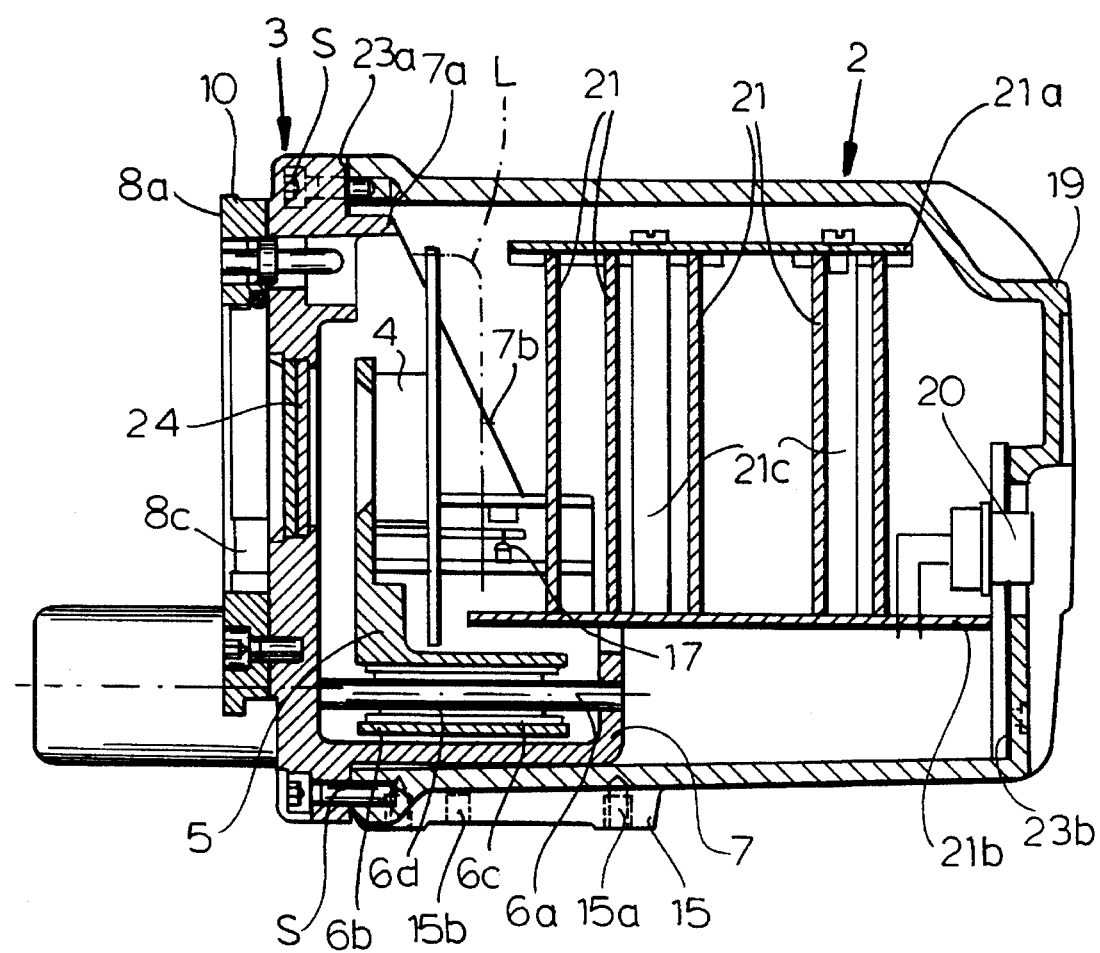
FIG. 2 is a vertical longitudinal section of the camera housing and measuring head in side view.
Figure 3:
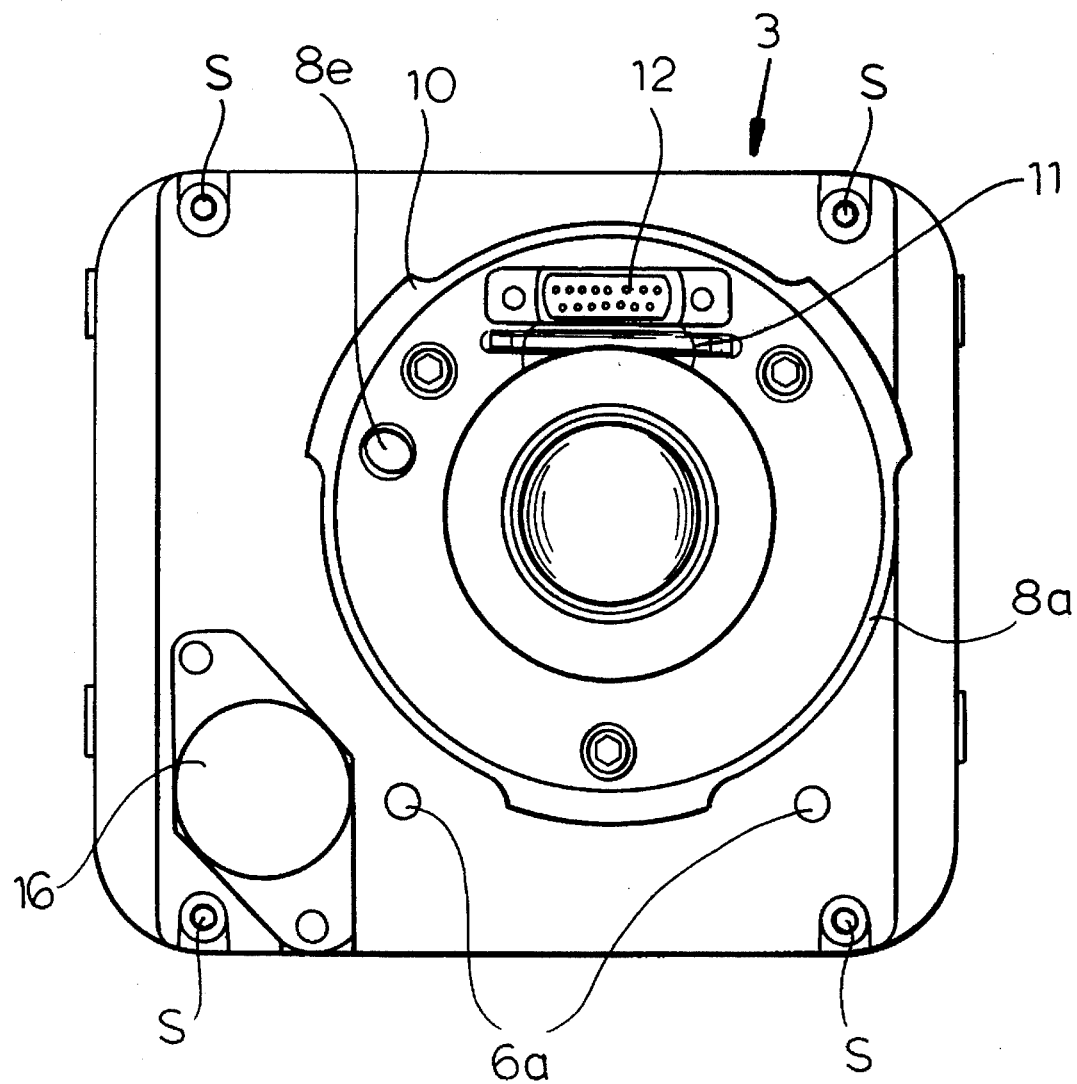
FIG. 3 is a front elevational view of the measuring head of a measuring camera according to the invention.

According to FIG. 2 and FIG. 3, the roller guide has two guide columns 6a whose length is determined by the focussing displacement of the semiconductive image sensor 4 and which is mounted at one side (front) in the measuring head 3 and on the other side (rear) in the upwardly bent endpiece of the support 7 (in the lower region). The two guide columns 6a, which are mutually axially parallel, spaced apart and parallel to the reference axis, are spacedly surrounded by guide bushes 6b. Between each guide column 6a and guide bush 6b there is formed a ball cage 6c in which is disposed the guide balls 6d according to FIGS. 2 AND 3 to constitute a high-precision bearing guide. The guide tracks defined by the guide columns 6a and the guide bushes 6b for the sensor carrier 5 thus are oriented with the narrowest of parallelity tolerances with respect to the reference axis 9 (FIG. 1) of the measuring head 3 and simultaneously with respect to the objective-camera interface, so that over the focussing range, correspondingly small image meandering results and which, moreover, because of the nature of the guide means (the described roller guide), is to a high degree reproducible. Since the support 7 for the guide means is in the form of a closed frame construction of high stiffness, the geometric factors are guaranteed to remain constant with time. To compensate the functioning and fabrication play between the reference elements on the objective 1 and the measuring head 3, namely the close-fitting cylinder 8b on the objective 1 (FIG. 4) and the close-fitting bore 8c, appropriate means can be advantageously provided. Such means can be an elastic compensation, as for example a tangentially arranged bendable spring 11 (FIG. 3) which applies in radial direction a pressure against the close-fitting cylinder 8b of the objective 1.

Figure 4:
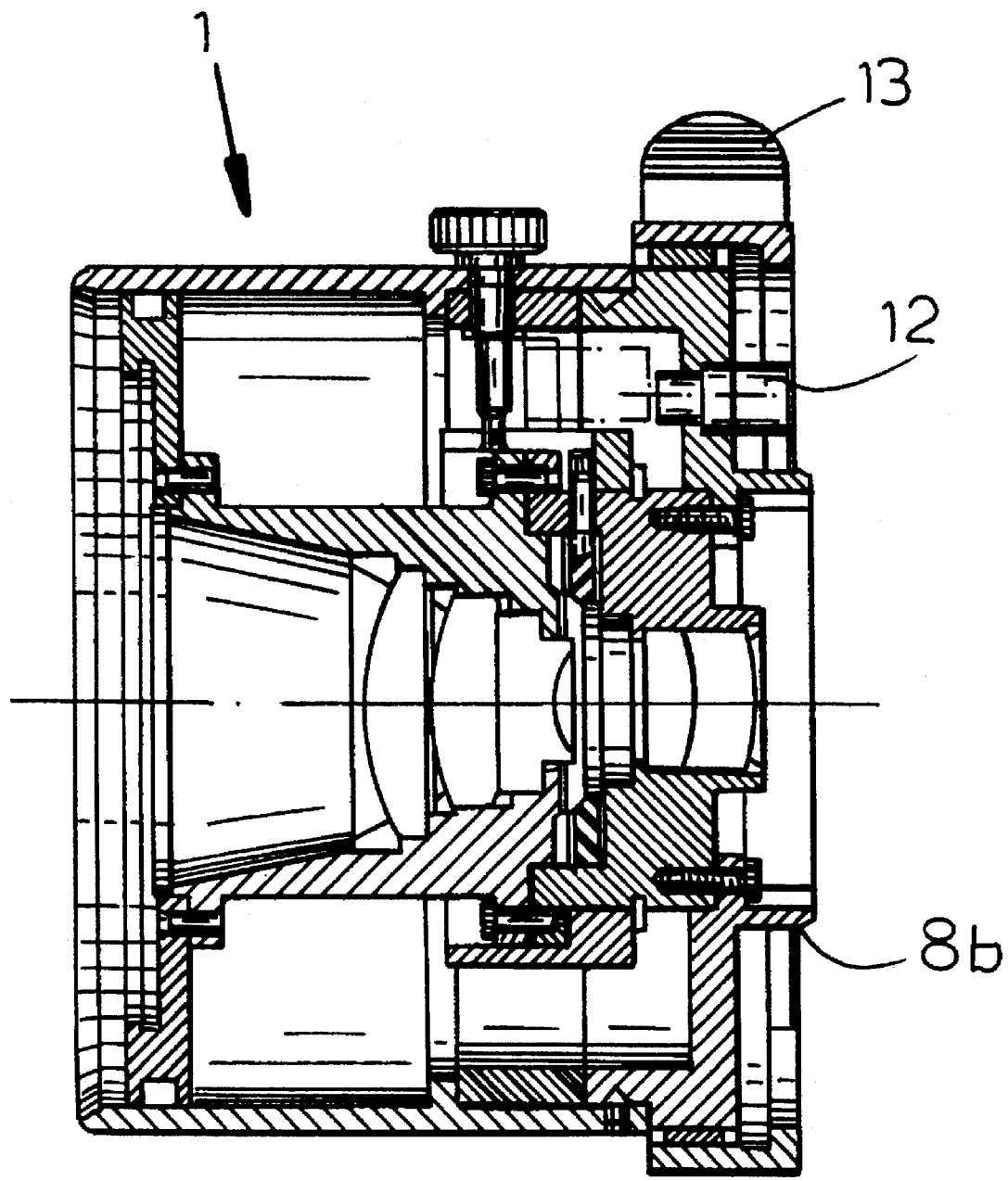
FIG. 4 is a vertical longitudinal section of the objective of a camera according to the invention in side elevation.

In the objective-camera interface 8, in this embodiment, there is also integrated an electrical plug connection 12 (FIGS. 3 AND 4 to control the objective diaphragm between the objective 1 and the measuring head 3 (and the camera housing 2). Indeed this integrated plug connection is so constructed that the electrical connection is automatically and positively plugged in and effected. The integrated plug connection is thus protected within the measuring camera and is user friendly (i.e. is made automatically and cannot be forgotten). The connection between the objective 1 and the measuring head 3 at the interface is preferably effected as a bayonet connection comprised of a bayonet flange 10 on the front side of the measuring head 3 (FIG. 3) and a retaining ring 13 on the connecting side of the objective 1 (FIG. 4).

The receiver surface of the semiconductive image sensor 4 is within narrow tolerances parallel to the reference surface 8a of the objective-camera interface 8. Furthermore, the axis of the semiconductive image sensor 4 (sensor axis), which is defined by a perpendicular to the sensor surface midpoint, is aligned with the reference axis 9 of the measuring head and is laterally oriented (compare FIG. 1), which aims at coincidence of the sensor axis and reference axis of the measuring head by appropriate adjustment and, moreover, coincidence with the optical axis of the objective 1.

The precise azimuthal orientation of a line of the semiconductive image sensor 4 to a connecting surface of the measuring head 3 (to the objective 1) is set by the mechanical relationship of connecting elements of the camera housing 2, according to FIG. 2, in the form of threaded bore or bores 15a and arresting bore or bores 15b on the underside of the camera housing 2, to a holder or a support not shown in the drawing, which orients and aligns the measuring camera with respect to the object.

The measuring head 3 and the camera housing 2 are, as can be seen from FIG. 2 and FIG. 3, releasably connected together by means of fastening screws S.

Means can also be provided for a catch assembly as long as an absolute axial positioning of the semiconductive image sensor 4 is established. The actual axial position of the semiconductive image sensor 4 can be measured by an optoelectronic light curtain 17 in FIG. 2, or a linear potentiometer (linear travel transducer) 18 in FIG. 5. From the data obtained from these, the respective camera constants 22 can be definitively derived. For this purpose, the light curtain 17 (according to drawing FIG. 2) is disposed rearwardly of the semiconductive image sensor 4 with spacing therefrom upon the sensor carrier 5, whereby the transmitter and receiver of the light curtain 17 are connected with the measuring head 3 and a coding-carrying contact member is connected with the sensor carrier 5. The linear potentiometer 18 is (according to drawing FIG. 5) also disposed rearwardly of the semiconductive image sensor 4 with spacing from the latter and connected with the carrier 7 of the measuring head 3, while the wiper (the wiper contact) of the potentiometer 18 is connected with the sensor carrier 5.

Figure 5:
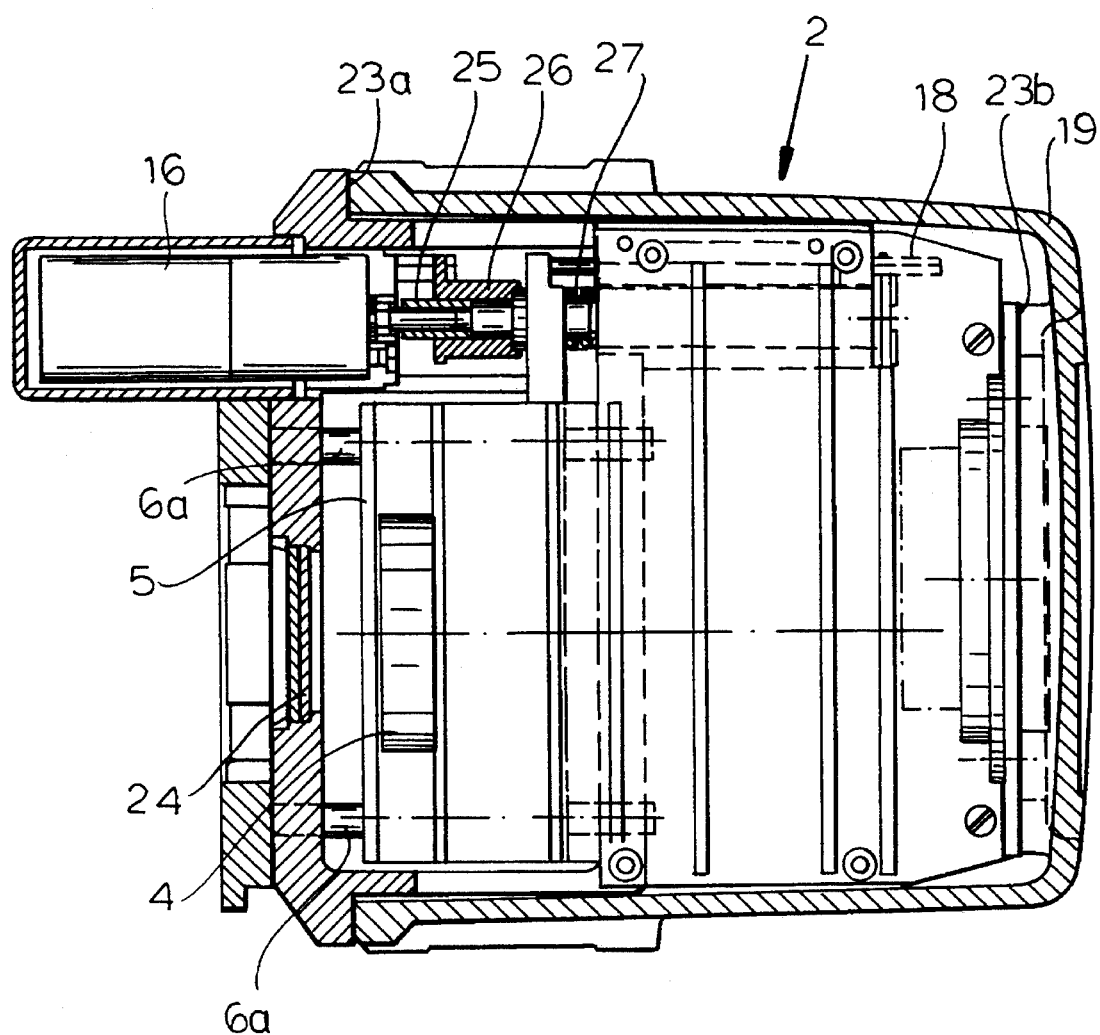
FIG. 5 is a horizontal longitudinal section of the camera housing of a measuring camera of the invention in plan view.

The elements for setting an actual axial position of the semiconductive image sensor 4 can be a motorized drive 16 as schematically illustrated in FIG. 3 and in FIG. 5, axially shifting the sensor carrier 5 by a screw drive formed by a screwthreaded spindle 25 and a screwthreaded nut 26. To compensate for axial play between the drive members (drive 16, screwthreaded drive 25, 26, sensor carrier 5) a compression spring 27 can be provided flush with the axis of the drive 16, and which applies a backward pressure against the sensor carrier 5. There can, however, be provided a manual drive (e.g. a fine-adjustment screw), not shown in the embodiments of the drawing, for the sensor carrier 5.

The motorized drive 16 can preferably be a direct current motor, a piezoelectric drive or a stepping motor.

The camera housing 2 can, according to FIG. 2 and FIG. 5, have a wall 19 formed of cast metal and which, together with the carrier 7 and the parts belonging to the camera electronics 21, can be encapsulated from the surroundings by means of seals 23a and 23b, whereby the objective-side opening in the measuring head is closed by means of a protective glass 24.

The reference character 20 designates the camera/image processor interface in FIG. 2, whereby the electronic equipment for processing and evaluating the image signals is not illustrated in the drawing.

Because of the relocation and integration of the focussing means in the camera body, even upon focussing the position of the projection centrum P with reference to the housing-fixed coordinate system K remains unaltered and even upon replacement of the objective 1 the projection centrum P retains its position with sufficient reproducibility. The focussing is effected by axial shifting of the semiconductive image sensor 4 while guaranteeing a minimum known and constant displacement error so that the displacement error is correctable. The image-plane position and, therewith, the focus-dependent parameters of the internal orientation are continuously known with higher precision because of separate position measurement, and incorporated in the measuring algorithm.

The sensor carrier 5 can be designed for the selective reception of semiconductive image sensors 4 of various sizes. If the camera is connected via an interface 20 to a computer for image processing, from the latter, with suitable choice of the transmitted image, a control circuit can be operated for positioning the semiconductive image sensor and the focal plane 4 for the best sharpness plane to thereby effect an automatic focussing.

For electronic compensation of the temperature effect upon the camera constants 22, a temperature sensor not shown in the Figures, can be provided.

The semiconductive image sensor 4 is preferably a CCD image sensor (e.g. of the Interline Transfer type with 756(H)× 581(V) active pixels). The readout of the image sensor 4 and the preparation of the image signals for the signal processing and evaluation is effected in the manner known for CCD video cameras and which have proved to be satisfactory. The camera electronics can be modular for simple matching to the respective image sensor 4 used and/or the camera/image processing interface 20. In the embodiment of FIG. 2, the camera electronics is comprised of five printed circuit boards 21 onto which the active and passive electronic components are affixed, the printed circuit boards being plugged into a mother board 21a and affixed by a cover 21b, whereby optionally between the mother board 21a and cover 21b spacer posts 21c indicated in FIG. 2 spacer posts can be provided. The dot-dash line L in FIG. 2 represents the electrical connection of the semiconductive image sensor 4 with the mother board 21a.

The objective 1 used is preferably of high precision and simple construction. As has previously been indicated, with the measuring camera, advantageously different objectives 1 with integral interfaces can be used, which can be matched to the respective measuring goal and respectively substituted for one another depending upon the measuring results actually to be accomplished. Advantageously the objectives 1 carry an electronic coding which can be read by a computer to yield typical and/or individual optical data. It can also have a diaphragm drive and/or a position transducer to transmit the diaphragm setting in the objective 1 across the camera/image processing interface 20 to the computer, so that via the computer by evaluation of the transmitted image (by means of software) a control circuit is provided for matching the diaphragm in objective 1 with the object brightness. By selective use of objectives 1 with variable focal length and by equipping them with a focal-length drive and/or position transducer, information as to the focal length can be transmitted to the computer across the camera/image processing interface 20 for setting of the focal length (by means of software) from the computer. With a varifocal objective with a position transducer, the correction required during focal length variation in the back lens to image distance is achieved by computer-controlled shifting of the semiconductive image sensor 4.

Of special significance for the measuring exactitude of the measuring camera of the invention, is the guide assembly for the sensor carrier 5. The guide comprises two precision roller guides which, as has been stated as to FIG. 2 are respectively comprised of guide posts 6a, guide bushes 6b, ball cage 6c and guide balls 6d in which the matching of the guide column 6a and the guide bush 6b together with the guide balls 6d is so effected that they are machined with high precision and so selected that a prestressing results to ensure a play-free and low-friction guidance. Since, by means of this roller guide there is an elimination or reduction of the adhesive friction the sensor carrier can be adjustable for the smallest focussing displacement. The positions of the two guide columns 6a is also visible from FIG. 3 and FIG. 5, whereby in FIG. 5 the sensor carrier 5 with the semiconductive image sensor 4 is located above them. The measuring head 3 with the carrier 7 is preferably formed as a cast-frame construction in anodized aluminum, while the guide means 6a is 6b, 6c, 6d is preferably of high-strength high-alloy steel. As a result there is a high degree of stiffness of the means for guiding the sensor carrier 5. Even the walls 19 of the camera housing 2 are preferably made of aluminum, preferably anodized. With the aforedescribed selection of the materials anodized aluminum or high strength steel a corrosion-safe construction of the camera body 3, 2 is achieved which ensures the retention of a measuring camera for its life.

The measuring camera is preferably a CCD camera (CCD= charge-coupled device) because with such technology the highest measuring precision to date can be achieved.

We claim:

1. A measuring camera, comprising:
   a camera housing;
   an objective lens unit at one end of said housing;
   a measuring head affixed to said housing at said one end thereof and comprising:
      a rigid frame extending into said housing and formed with an opening along an optical axis geometrically fixedly defined in said housing by said frame,
      means forming a reference surface around said opening against which said objective lens unit abuts to align said objective lens unit with said optical axis and positioning said objective lens unit so that a projection centrum thereof is located precisely at a geometrically fixed location along said axis with reference to said housing and said head,
      means for affixing said objective lens unit on said frame interchangeably with other objectives such that each objective is positioned by said surface with a projection centrum thereof at said location, and
      a precision guide on said frame within said housing extending parallel to said axis;
      a carrier displaceable substantially without play along said guide parallel to said optical axis;
      a semiconductive image sensor lying in a plane perpendicular to said optical axis and fixed to said carrier for displacement therewith parallel to said optical axis over a focussing range between positions relatively proximal to said objective lens unit and relatively remote from said objective lens unit for focussing an image from said objective lens unit on said semiconductive image sensor;
      a drive in said housing operatively coupled to said carrier for displacing said carrier over said range; and
      a position-measuring means in said housing between said frame and said carrier for detecting an actual position of said sensor relative to said frame.

2. The measuring camera defined in claim 1 wherein said precision guide comprises:
   a pair of mutually parallel spaced apart columns rigidly secured in said frame;
   respective guide sleeves surrounding said columns and fixed in said carrier;
   respective ball cages received in said sleeves around said columns; and
   balls in said ball cages.

3. The measuring camera defined in claim 1 wherein said drive includes an electric motor.

4. The measuring camera defined in claim 1 wherein said drive includes means for manually shifting said carrier on said guide.

5. The measuring camera defined in claim 1 wherein said carrier is provided with means for mounting a selected one of a plurality of semiconductive image sensors of different sizes on said carrier.

6. The measuring camera defined in claim 1 wherein said position-measuring means is a linear potentiometer.

7. The measuring camera defined in claim 1 wherein said position-measuring means includes means forming a light curtain.

8. The measuring camera defined in claim 1 wherein said head has a protective glass window closing said opening and is sealed to said housing so that said head, said window and said housing form an enclosure encapsulating an interior of said housing against external electrical and climatic environmental influences.

9. The measuring camera defined in claim 1, further comprising a bent spring on said head bearing upon said objective lens unit for compensating lateral play thereof.

10. The measuring camera defined in claim 1 wherein said means for affixing is a bayonet coupling.

11. The measuring camera defined in claim 10, further comprising an electric plug connection between said objective lens unit and said measuring head integrated in said bayonet coupling.

12. The measuring camera defined in claim 1 wherein said objective lens system is provided with a diaphragm, computer adjustable to match a diaphragm opening to the brightness of an object picked up by said objective lens unit.

13. The measuring camera defined in claim 1 wherein said objective lens unit is a varifocal objective.

14. The measuring camera defined in claim 3 wherein said drive further comprises a screw transmission connected to said motor and a compression spring braced against said carrier to compensate axial play in said drive.

15. The measuring camera defined in claim 1 wherein said sensor is a carriage coupled device.

* * * * *